Patented Jan. 17, 1928.

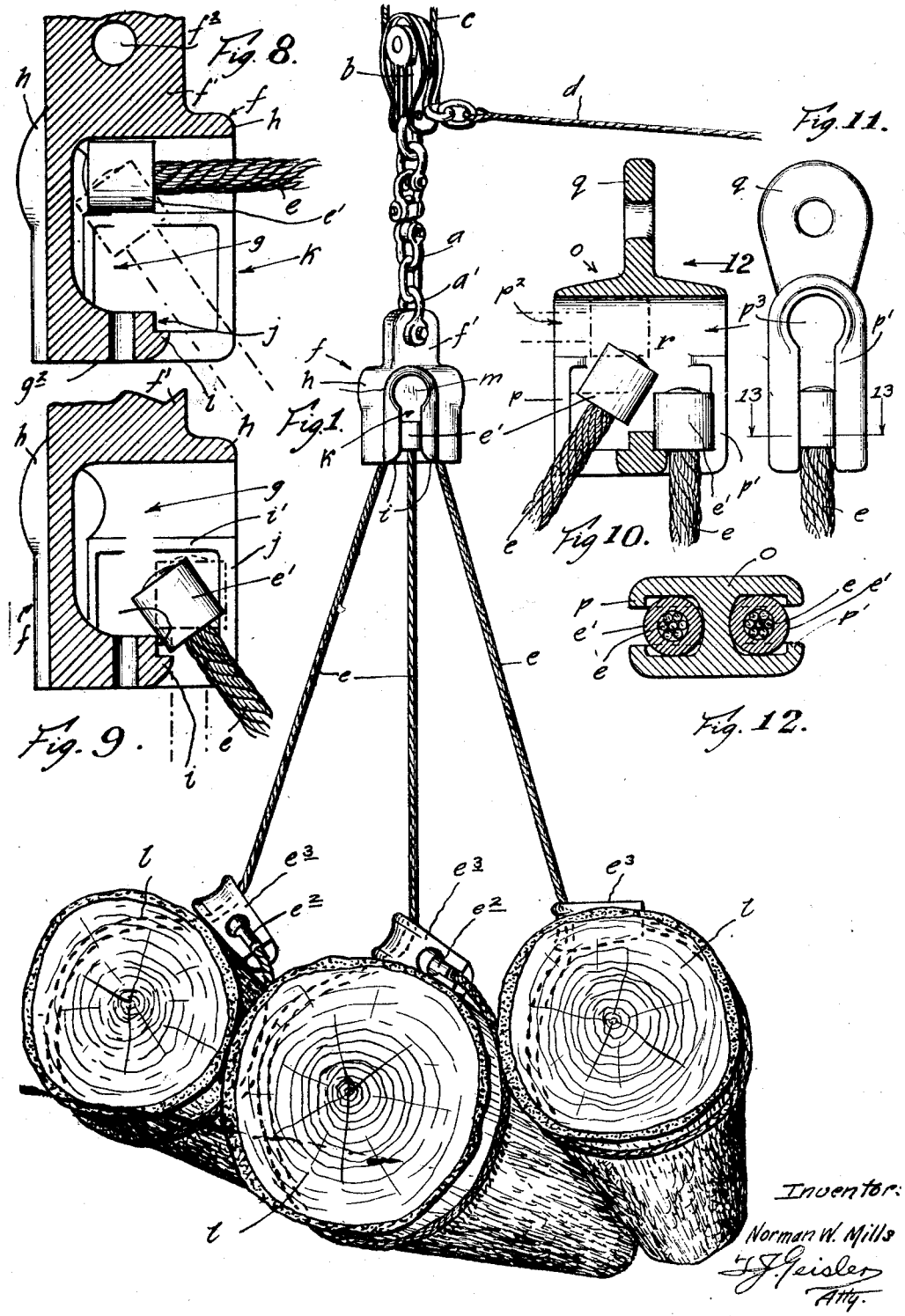

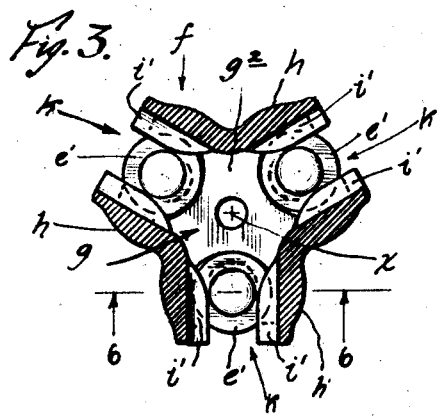

1,656,670

UNITED STATES PATENT OFFICE.

NORMAN W. MILLS, OF PORTLAND, OREGON.

BUTT HOOK.

Application filed May 6, 1926. Serial No. 107,212.

My invention relates to logging operations in which the main line has several choker lines fastened to it.

The object of my invention is to provide a butt-hook carried by said main line which butt-hook will facilitate the rapid engagement and disengagement of one or a number of choker lines to the main holding line. That is, the object of my invention is to provide a butt-hook to which one or a plurality of choker lines may be easily and quickly engaged and disengaged and which butt-hook will not be twisted nor distorted to chafe said choker lines by said change in number.

I attain this object by providing a butt-hook with a plurality of sockets each adapted to be engaged by an enlarged end of a choker line, and with said sockets arranged radial to and adjacent the longitudinal axis of the butt-hook, thereby spacing the points of detachment of the choker lines from each other to permit all or any number of said sockets to engage the enlarged ends of choker lines without causing said butt-hook to be moved angularly about its connection to such a degree that it would chafe said choker lines.

Heretofore, I have known of no butt-hook which permitted a varying number of choker lines to be connected to the main line without affecting its connection. If, therefore, a number of chokers were fastened to the butt connection and only a portion of them were connected to logs the remaining chokers would be free to fly about and tangle with those chokers engaged to logs. The flying chokers not only tangle the rigging and cause delays, but also wear the chokers and other portions of the rigging so that the life of the latter tends to be relatively short. To eliminate this difficulty many operators provide chokers of extra length and pass one choker about a bunch of logs. Often one of the logs is lost while being hauled in, and remains on and blocks the skidway and is splintered, and rendered commercially valueless by the following logs which strike against it.

The further object of my invention is to provide a butt-hook of this character which is of minimum weight so that it may be easily handled. Also to prevent the inadvertent disengagement of the choker line from the butt-hook. To this end, I make my butt-hook of a casting in which the central portion is cored out or chambered so that said butt-hook consists merely of a shell, and the walls of said central chamber are provided with a plurality of sockets leading into and disposed radially about the said central chamber. The sockets are provided with key-hole slots. The central chamber is of such size as to accommodate only one enlarged cable end at a time; and to disengage this enlarged end, it must be moved into the said central chamber before it can be alined with the larger portion of the keyhole slot of the socket.

The further details of construction and mode of operation of my device are hereinafter more fully described with reference to the accompanying drawings in which:

Fig. 1 is a perspective view of my improved butt-hook connected to three choker ends noosed about a corresponding number of logs;

Fig. 2 is a side elevation of my improved butt-hook and shows a portion of the ends of three chokers;

Fig. 3 is a section taken on the line 4—4 of Fig. 2;

Fig. 4 is a section taken on the line 5—5 of Fig. 2;

Fig. 5 is a sectional elevation taken on the line of 6—6 of Fig. 3;

Fig. 6 is an end elevation taken on the lines 7—7 of Fig. 2;

Fig. 7 is a longitudinal section taken on the line 8—8 of Fig. 4 through one socket of my butt-hook;

Figs. 8 and 9 are similar sections as shown by Fig. 7, these figures illustrating the manner of engaging and disengaging the enlarged knob-like end of a choker line;

Fig. 10 is a section through a modified structure embodying my invention in which only two sockets are provided;

Fig. 11 is an end elevation of said modification looking in the direction of arrow 12 in Fig. 10; and Fig. 12 is a section taken on the line 13—13 of Fig. 11.

My improved butt or bull-hook is adapted to be carried by the standard butt-rigging $a$ which is commonly fastened to a block $b$, mounted in the bight of the main line $c$ and connected to a "haul-back line" $d$. Said butt rigging $a$ is preferably formed of links of chain, or a plurality of shackles so as to permit said connection to be twisted about its axis.

The butt-hook embodying my invention preferably is adapted to engage chokers $e$ of the type shown in the United States Patent No. 917,738, granted to Andrew Opsal, and entitled Choker line for log hauling cables, and in improvements of said type. The essential difference between said type of chokers and common types are that the ends $e'$ and $e^2$ are formed into knobs instead of eyes and one of said knobs is releasably engaged by the choker hook $e^3$, the other end is engaged by the butt connection, as shown in Fig. 1.

My improved butt-hook comprises a dome-like body $f$ provided with an integral connecting ear $f'$ provided with a hole $f^2$ therein, which ear is adapted to be connected to the shackle $a'$ of the butt rigging. Said dome-like body $f$ is provided with a central chamber $g$ closed at the top by the dome-like top $g'$ of said body and at the bottom by an integral web $g^2$.

Communicating with said chamber and spaced substantially equi-distant and radially thereabout are a plurality of choker receiving sockets $h$, said sockets being arranged to extend as close as possible to the longitudinal center line of said chamber $g$ which center line extends through the point $x$, in Fig. 4. That is, the sockets are arranged relatively to the chamber so that a minimum space is provided between the sockets. Said central chamber thus is formed to be of sufficient size only to receive one of the knob like ends $e'$ of the chokers at one time and after said end has been passed into said chamber and slipped into one of the sockets $h$ then, only, can another choker be inserted in by said butt-hook. This feature permits the butt-hook to be made of minimum size and of minimum lightness so as to make my butt hook easy to handle by one man in the woods.

All of said sockets $h$ are identical in structure and thus I will describe but one of them and will designate the similar portions of the other sockets by the same reference characters. Each socket is provided with horizontal flanges $i$ and $i'$ at each side, the flanges $i$ being at the bottom of the socket, and the flanges $i'$ being at the top. Each of said sockets is provided with a key hole slot $k$, as shown in Fig. 5. The larger portion of the slot $k$ is adapted to permit the insertion of the enlarged end $e'$ of the choker line, while the narrow portion of the slot extends downward to the bottom of the butt-hook, which encloses the space $i$, and permits the passage only of the choker line $e$.

The interior recess $k'$ of the socket $k$ is dimensioned to receive and hold the enlarged end $e'$ of the choker line, closely so that it will be prevented from twisting angularly in its socket.

As shown in Fig. 1 when a butt hook is made with three sockets and engages three logs $l$ of substantially equal size, the longitudinal axis of said connection extends through the center of the butt rigging and is in alinement therewith. If, however, one log is substantially heavier than the other two logs, or if one log only is brought in by the main line the weight thereof would tend to tip the butt hook substantially as shown in Fig. 2. And since said slots $k$ extend substantially radial to the longitudinal axis of the butt hook, the tilting of the latter does not tend to chafe or otherwise interfere with the choker.

To connect said knob-like end with a socket, it is necessary that the enlarged end $e'$ of the choker be inserted end-wise into the hole $m$ of the slot $k$ until it lies within the central chamber $g$. The said enlarged choker end may then be moved downwardly and turned outwardly into the interior $k'$ of the socket until seated on the flanges $i$ and is held against outward movement by the flanges $j$. The upper horizontal flanges $i'$ on the interior of the sockets serve to prevent the enlarged choker end $e'$ from being forced upwardly directly from its seat. That is, if the choker $e$ should be lifted in its socket by the log striking the ground or otherwise said enlarged choker end is prevented from moving directly into alinement with said aperture $m$ by the flanges $i'$ which direct it inwardly into the central chamber $g$. Thus, when said choker is again tensioned said enlarged choker end is again directed downwardly and seated in the socket thus to prevent the inadvertent disengagement of said choker end from the butt hook.

In Figs. 10 to 12 inclusive, I show a modification in my invention in which the body $o$ of the butt-hook is provided with but two sockets $p$—$p'$, which sockets are identical to the ones in the previous figures and thus are not described again. The body $o$ is provided with an eye $q$.

This hook is substantially flat as shown by Fig. 12, and comprises a central chamber $r$ which communicates with the sockets $p$ and $p'$ which are provided with key-hole slots $p^2$ and $p^3$.

I claim:

1. A butt hook for the purpose described comprising a hollow body provided with means for fastening to a line, the body consisting of a central chamber and sockets disposed radially about and communicating with said central chamber, the outer wall of each socket provided with a key hole slot, the narrower portion of which extends downward and through the bottom of the socket, the sockets being adapted to receive the enlarged cable-end, and said narrower portion of the slot being adapted to pass only the cable, and its enlarged portion being adapted to admit the enlarged cable end, whereby in order to disengage the cable, its enlarged end must first be moved into said central chamber to permit the alinement of its enlarged end with the larger portion of said slot.

2. A butt hook for the purpose described comprising a hollow body provided with means for fastening to a line, the body consisting of a central chamber and sockets disposed radially about and communicating with said central chamber, the outer wall of each socket provided with a key hole slot, the narrower portion of which extends downward and through the bottom of the socket, the sockets being adapted to receive the enlarged cable-end, said narrower portion of the slot being adapted to pass only the cable, and its enlarged portion being adapted to admit the enlarged cable end, the interior of the sockets being provided with a flange, parallel with and spaced from the bottom of the socket, thereby to prevent the straight lift of the enlarged cable end in the socket, and its displacement therefrom, except by being first inclined towards and moved into the said central chamber of the butt hook.

NORMAN W. MILLS.